Jan. 17, 1967        L. A. KAPLAN        3,299,001
ISOLATION AND PURIFICATION OF PHOSPHONITRILIC CHLORIDE ADDUCTS
Original Filed June 20, 1960
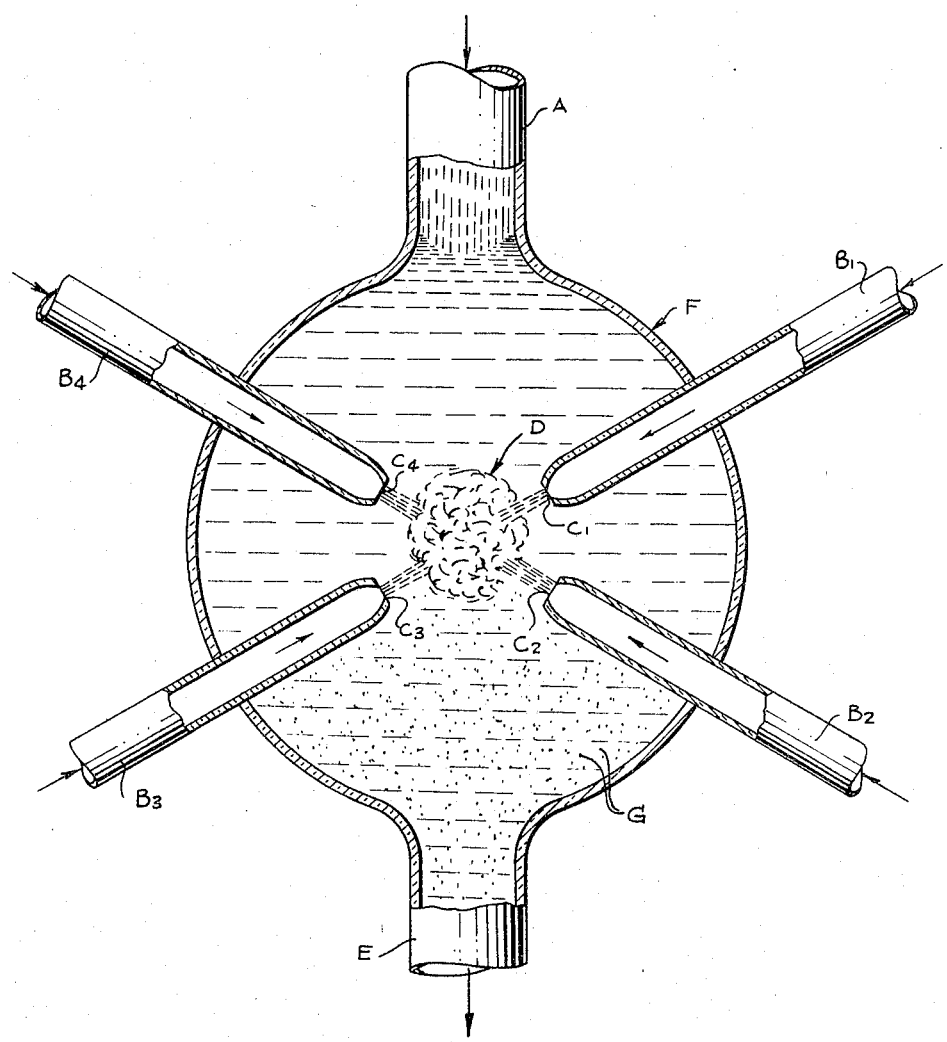
INVENTOR.
LLOYD A. KAPLAN
BY
ATTORNEYS

United States Patent Office 3,299,001
Patented Jan. 17, 1967

3,299,001
ISOLATION AND PURIFICATION OF PHOSPHONITRILIC CHLORIDE ADDUCTS
Lloyd A. Kaplan, Silver Spring, Md., assignor to General Dynamics Corporation, San Diego, Calif., a corporation of Delaware
Continuation of application Ser. No. 37,466, June 20, 1960. This application July 27, 1964, Ser. No. 385,517
12 Claims. (Cl. 260—47)

This invention relates to a process for the isolation of water-insoluble reaction products from the reaction mixture thereof. The invention is particularly concerned with the isolation and purification of the adducts of phosphonitrilic halides and polyfunctional organic compounds from the reaction mixture thereof, especially the adducts of phosphonitrilic chlorides and aromatic polyhydroxy compounds. The preparation of these adducts is described in copending applications Serial Numbers 820,573 and 820,574, filed on June 16, 1959, by Rip G. Rice and Robert L. Riley, both now abandoned, and also described in the copending applications of Rip G. Rice and Robert L. Riley, Serial Numbers 31,813 and 31,814, filed May 26, 1960.

This application is a continuation of application Serial No. 37,466, filed June 20, 1960, and now abandoned.

As described in the copending applications, a phosphonitrilic halide is dissolved in any of a variety of organic solvents such as dioxane, a polyfunctional organic compound capable of reaction with the phosphonitrilic halide is added, the mixture is heated to reflux, then an organic tertiary amine is added which is capable of accepting the hydrogen chloride eliminated during the reaction of the phosphonitrilic halide and the polyfunctional organic compound. The mixture then is stirred and heated until the reaction is complete.

For example, phosphonitrilic chloride, in the form of the cyclic trimer, cyclic tetramer, or mixture of the cyclic trimer and tetramer is dissolved in dioxane or carbon tetrachloride, hydroquinone is added in an amount preferably at least, and usually in excess of, two mols per mol of $PNCl_2$ present in the phosphonitrilic chloride employed, the mixture is stirred and heated to reflux, then an organic tertiary amine, such as pyridine, is added in an amount at least equivalent to the number of chlorine atoms to be removed from the phosphonitrilic chloride employed, and the resultant mixture is stirred and further heated for several hours.

The adduct of phosphonitrilic halide and polyfunctional aromatic compound separates from the mixture in the form of a viscous oil. This oil contains, in addition to the desired adduct, the hydrochloride of the tertiary amine employed, e.g., pyridine hydrochloride, a portion of the excess tertiary amine, a portion of the excess polyfunctional aromatic compound, and a portion of the solvent used, all of which constitute impurities in the adduct.

The isolation and purification of the adducts of phosphonitrilic chloride and polyfunctional compounds such as hydroquinone, as described in the above copending applications is briefly as follows: The solvent is decanted, the oil is poured into a large volume of water, and the mixture is allowed to stand for a substantial period to leach out as many of the impurities as possible. The water is then removed, the semi-solid residue is ground under a large amount of fresh water, the wash liquid discarded and this grinding and washing process is repeated until the impurities have been washed from the adduct, such condition being reached when the odor of pyridine is no longer prevalent. During the repeated grinding and washing, the adduct of phosphonitrilic chloride and hydroquinone slowly changes from a semi-solid to a solid material. The now solid material is filtered, dried, then dissolved in a large volume of acetone. This solution is filtered to remove an amount of acetone-insoluble material, which is formed as a decomposition product of the adduct as a result of the prolonged exposure of the adduct to water, and the clear filtrate is evaporated to dryness to yield the purified adduct of phosphonitrilic chloride and hydroquinone.

The isolation process described above has several disadvantages. One is the large amount of time required for this procedure which is inherent in the large number of steps required, including the repeated grinding of the semi-solid under several portions of water, the tedious filtration of the acetone solution due to the relatively high viscosity of the solution, and the tedious evaporation of the relatively large volume of acetone from the filtrate.

Another disadvantage of the above described procedure is the fact that the oil does not yield a readily handled solid adduct in a relatively simple manner, but rather passes through a semi-solid stage, in which form the adduct is difficult to handle. The oil, when poured into water, becomes a semi-solid material rather than a solid material because of the presence of relatively large quantities of impurities, i.e., tertiary amine hydrochloride, excess tertiary amine, excess hydroquinone, and solvent which has been mechanically entrapped by the oil. These impurities, although completely water soluble by themselves, are leached out of the oil only slowly, thus giving rise to the slow transition of the oil, through a gummy semi-solid stage, to the purified solid adduct.

Still another disadvantage of the above described isolation procedure is the fact that the crude solid adduct, obtained after the prolonged water washing, contains an amount of material which is acetone-insoluble. This acetone-insoluble material is not formed during the original condensation reaction of phosphonitrilic halide with polyfunctional compound, but rather is formed as a result of some decomposition of the crude adduct during its prolonged exposure to water. The decomposed product must be removed from the adduct.

A consequence of the decomposition of the adduct during the above described isolation procedure is the fact that the yield of pure adduct is correspondingly lowered.

One object of the invention is the provision of procedure for purifying and isolating from a crude oil containing a reaction product and impurities, said reaction product in the form of a solid material free of said impurities.

It is a particular object of this invention to provide a procedure for the isolation and purification of adducts of phosphonitrilic halides and polyfunctional organic compounds which will allow conversion of the crude adduct, obtained from the reaction pot in the form of an oil, to a solid material essentially free of impurities.

Another object of the invention is to provide a procedure for the isolation of adducts of phosphonitrilic halides and polyfunctional organic compounds which will allow conversion of the crude product from an oil to a solid material essentially free of impurities in a relatively short period of time.

A further object is to provide an isolation procedure which can be adapted readily to small, intermediate, and large scale syntheses of adducts of phosphonitrilic halides and polyhydroxy-aromatic compounds, as may be required by laboratory, pilot-plant, and commercial needs.

Still another object is to provide a process for the isolation of adducts of phosphonitrilic halides and polyhydroxyaromatic compounds which will allow conversion of the crude oily adduct to a solid product essentially free from impurities without passage of the product through a semi-solid stage.

Still another object is to provide a procedure for isolation of these adducts which will eliminate the need for a treatment of the crude adduct with water for extended periods of time, which extended treatment results in some decomposition of the adduct with attendant loss in yield of product.

Still another object is the provision of efficient apparatus for carrying out the foregoing procedure.

These and other objects of the invention will appear hereinafter.

The foregoing objects are achieved, according to the invention, by dissolving the crude oil containing the adduct of phosphonitrilic chloride and polyfunctional material, e.g. hydroquinone, tertiary amine hydrochloride, excess tertiary amine, excess hydroquinone and excess solvent employed as reaction medium, in a water-soluble solvent of the nature hereinafter described, and introducing the resulting solution in the form of a stream or streams into a zone containing a relatively large volume of a liquid, preferably water, which dissolves all of the impurities in the crude oil, but not the adduct. Such liquid or water is termed herein the "drowning" medium, and is preferably under continuous agitation and is continuously replaced with fresh drowning medium, e.g. water, into which fresh streams of the solvent solution of the crude oil are introduced. Under these conditions the water-soluble impurities of the original condensation of phosphonitrilic chloride and hydroquinone, i.e. pyridine hydrochloride, pyridine, and hydroquinone, as well as the water-soluble solvent used to dissolve the oily reaction product are dissolved rapidly in the large moving volume of wash water and, at the same time, the water-insoluble adduct of phosphonitrilic chloride and hydroquinone is precipitated rapidly in a solid, rather than semi-solid form. The mixture is forced out of the zone of the "drowning medium" by the passage of the incoming body of wash water into such zone, and is collected in a tank beneath said zone, from which the adduct, now in the form of a light, flocculent solid, essentially free of impurities, is readily separated by filtration or, in some instances, by decantation, and is dried. The entire isolation process from the time of dissolution of oil in the water soluble solvent, to the time that the adduct is placed in a suitable drying apparatus, can be carried out in a remarkably short period, e.g. less than one hour. This is an outstanding improvement over the much longer period, e.g. of the order of about 24 hours required by the present isolation procedure.

In a preferred embodiment, a plurality of jets or streams of the solution of crude oil-containing adduct in the water-soluble solvent are directed into the drowning zone or chamber through which the large volume of drowning medium continuously flows, in such a manner that these streams impinge on each other substantially in a localized zone within the "drowning medium." In this manner the solution of oil containing the adduct is dispersed into a fine mist, which, upon contacting the relatively large volume of rapidly moving drowning liquid such as water, results in a very fine solid precipitate of the desired adduct, while the water soluble impurities present in the oil are dissolved in the relatively large volume of water. The continuous flow of fresh water into the drowning zone or chamber rapidly removes the freshly precipitated adduct and at the same time presents a continuous volume of water free from the water soluble impurities of the reaction, in which to receive the solution of crude oil-containing adduct which is continuously entering the drowning zone or chamber.

According to still another embodiment an inert gas such as air, nitrogen, oxygen, argon, carbon dioxide, and the like, preferably in the form of one or a plurality of streams or jets is introduced into the drowning medium simultaneously with the streams or jets of solution containing oily product. The jets of gas are preferably directed to impinge upon the jets of oil solution in a localized zone of the drowning liquid or water, providing a more vigorous and efficient mixing of the jets of oil solution in the drowning liquid to effect a more intimate and effective washing of the impurities from the solid adduct. This technique reduces, e.g. by as much as one half, the capacity of the drowning apparatus to process a given amount of oil solution per gallon of drowning liquid per unit of time. Further, the adduct obtained by this procedure is in purer condition than obtained by the technique described previously not employing jets of inert gas.

The effluent from the drowning chamber is collected in a zone located preferably below the outlet of the drowning chamber. Such effluent is in the form of a mixture of light, flocculent solid adduct of phosphonitrilic chloride and polyfunctional material such as hydroquinone, and a water solution of the solvent used to dissolve the oil and the water soluble impurities previously contained in the crude oil. From this mixture the solid adduct can be separated readily by decantation or filtration, washed with water, if desired, and then transferred to any convenient drying apparatus.

The process of this invention is continuous and rapid, and effects substantial savings of time when compared with the procedure of the above copending applications.

The accompanying drawing illustrates one form of novel apparatus in which the process of the invention can be carried out, it being understood that the apparatus of the invention is not intended to be limited by such illustrative instance.

The apparatus illustrated in the drawing can be constructed of any suitable material of construction, such as Hastelloy, Monel, glass, etc.

Referring to the drawing, the letter F designates a spherical chamber having a liquid inlet A and a liquid outlet E. The letters $B_1$, $B_2$, $B_3$ and $B_4$ represent inlet tubes which project into the interior of the chamber A. The inner ends of these tubes are constricted to form small openings $C_1$, $C_2$ $C_3$ and $C_4$, respectively. It will be noted that tubes $B_1$ and $B_3$ are in diametric opposite alignment, as are tubes $B_2$ and $B_4$. Thus, liquids pumped through all four tubes simultaneously will impinge in a common location at the intersection of the streams from $B_1$ and $B_3$, and from $B_2$ and $B_4$, indicated at D, which is preferably at the center of chamber F. A tank (not shown) is placed beneath the outlet E to collect the exiting mixture including the precipitated adduct.

In carrying out the process for the isolation of adduct of, for example, phosphonitrilic chloride and hydroquinone, employing the above described apparatus, the drowning liquid, preferably water, is delivered continuously via inlet A to the drowning chamber F at a rate such as to substantially fill the chamber and to provide a discharge of liquid through outlet E. The solution of oily reaction product, from the reaction of phosphonitrilic chloride and hydroquinone, dissolved in a suitable water-soluble solvent as described hereinafter, is pumped rapidly from a reservoir tank (not shown) simultaneously through tubes $B_1$, $B_2$, $B_3$ and $B_4$ into chamber F. The resulting impinging streams of solution injected into the water in chamber F are vigorously agitated at the impinging location D within the large volume of rapidly moving water, producing a very fine precipitate of the adduct or product indicated at G, which is washed through the outlet E into the collecting tank below (not shown) by the continuous flow of pater through the chamber F. The flow of water through the apparatus is maintained until all of the oil-solvent solution being introduced via the tubes $B_1$ through $B_4$ has been processed. The solid product in the collecting tank can be separated from the liquid mixture, e.g. by decantation or other suitable means.

If desired, the above technique can be modified by pumping the oil-solvent solution into chamber F through any one or more inlet tubes, e.g. $B_1$ and $B_2$, while simultaneously, an inert gas such as air is pumped through the remaining inlet tubes, $B_3$ and $B_4$, at a suitable pressure, e.g. from about 3 to about 20 pounds per square inch.

This procedure results in two jets of air impinging upon two jets of oil solution in the center D of chamber F, providing a much more vigorous mixing of the components of the mixture than where no inert gas is employed and a more efficient removal of the impurities from the solid adduct.

Various modifications of the described drowning apparatus can be made without restricting the scope of this invention or design of the drowning apparatus used herein as will be apparent to those skilled in the art. Thus, the size and particular dimensions of the apparatus can be modified as desired to obtain the desired capacity. Increased capacity of the apparatus could be achieved by using a jet with several apertures. Such a jet may be similar to a synthetic fibre spinnerette. The number of jets entering into the drowning chamber F can also be increased or decreased with an attendant increase or decrease in size of the drowning chamber. Likewise, the diameter of the orifice of the jet can be varied.

The shape of the drowning chamber can be other than spherical. Baffles may be placed in the chamber F, if desired, to facilitate dispersal of the oil in the drowning water. Placement of the jets so that the effluent from each impinges upon a common point is not necessary, although this helps to disperse the oil throughout the chamber.

The process of my invention is particularly applicable for isolation of any of the condensation products or adducts produced as described in the above copending applications, by reaction of a cyclic phosphonitrilic halide such as the bromide or chloride, preferably the trimeric or tetrameric phosphonitrilic chloride or a mixture thereof containing about 75% trimer and 25% tetramer, with a polyfunctional organic material having at least two functional groups taken from the class consisting of hydroxy, mercapto, primary and secondary amino and primary and secondary amido groups. This latter material includes aromatic polyhydroxy compounds such as hydroquinone, pyrogallol, catechol and resorcinol, polymercapto compounds such as dithiohydroquinone and 1,6-hexanedithiol, polyamines such as o-, m- and p-phenylenediamine and ethylene diamine, secondary polyamines such as N,N-dimethylphenylene diamines, polyamides such as terephthalamide, oxamide and malonamide, and the like. Polyhydroxy aromatic compounds, particularly hydroquinone are the preferred polyfunctional materials.

The condensation reaction for producing the above noted adducts is carried out in the presence of an HCl acceptor for removal of all or a major portion of the chlorine atoms of the phosphonitrilic chloride. Tertiary amines such as aliphatic tertiary amines, e.g., tributylamine have been found suitable. The preferred materials for this purpose are heterocyclic tertiary amines, including the picolines and particularly pyridine itself. The reaction is also carried out preferably in a solvent medium. Such solvent can be a homogeneous solvent in which the reactants and the HCl acceptor are all soluble, or a heterogeneous solvent in which the phosphonitrilic chloride and the HCl acceptor are soluble but in which the polyfunctional material, e.g., hydroquinone, is insoluble. Examples of homogeneous solvents include ethers such as dioxane and nitriles, and examples of heterogeneous solvents include aliphatic hydrocarbons such as hexane and benzene, and chlorinated hydrocarbons such as carbon tetrachloride.

In preferred practice the amount of polyfunctional material employed is at least 2 mols per mol of $PNCl_2$ in the phosphonitrilic chloride, and the amount of HCl acceptor employed is sufficient to react with substantially all the HCl formed in the reaction, preferably employing at least 2 mols per mol of $PNCl_2$.

The reaction is a substitution reaction in which most or all of the chlorine atoms of the phosphonitrilic chloride are replaced by polyfunctional residues, and the reaction takes place under conditions including temperature such that the PN-containing rings of the phosphonitrilic chloride starting material are preserved in the final product. The condensation product is in the form of a polymeric chain material containing a plurality of PN rings, with adjacent rings linked by one or more residues of the polyfunctional starting material, in each of which linking residues a hydrogen atom of each of two of the functional groups has been removed. It is believed that such adjacent PN rings are linked by the linking of the polyfunctional residues to adjacent phosphorus atoms on adjacent rings by oxygen, sulfur, amino or amido radicals. Thus, where hydroquinone is the polyfunctional material, adjacent PN rings are linked by one or more p-phenylenedioxy radicals, and the polymer also containing p-hydroxy phenoxy residues containing free functional hydroxyl groups, within the polymeric chain and at the terminal portions thereof. The adducts may contain from 0 to about 10% chlorine, the chlorine atoms linked to some of the phosphorus atoms, and may have a molecular weight of about 1,000 to about 15,000, usually about 1,200 to about 6,000. As described in the above copending applications, it is believed that there is reaction of residual P-Cl groups generally present with functional groups such as phenolic OH groups at temperature of about 350–425° F., providing sufficient cross linking to render the resin solvent resistant, and on further heating at more elevated temperature, e.g., 500° F. a more complete cure is obtained.

It is believed that the condensation products have the following general formula:

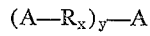

where A is a cyclic PN-containing ring and preferably is a member of the group consisting of $P_3N_3$ and $P_4N_4$ rings, R is a radical containing a member of the group consisting of aliphatic, aromatic and heterocyclic radicals, said radical R being linked to each A ring by a member of the group consisting of divalent oxygen, sulfur, amino and amido groups, said radical being other than aliphatic when both of said linking groups are oxygen, x is an integer of from 1 to 4, and y is an integer of at least 1, and up to 15 or more. Further, preferably y is 1 to 6. As described hereinafter, at least one of the radicals A may contain at least one chlorine atom connected to a phosphorus atom.

More specifically, the condensation products are believed to have a plurality of recurring groups of the formula

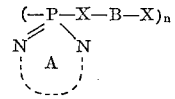

where A represents a member of the group consisting of $P_3N_3$ and $P_4N_4$ rings, B is a radical of the group consisting of aliphatic, aromatic and heterocyclic radicals, X is a member of the class consisting of divalent oxygen, sulfur, amino and amido radicals, and both X's may be the same radical or different radicals, B being other than aliphatic when both X's are oxygen, and n is an integer of at least 2, e.g., from 2 to about 15, or more, preferably 2 to 7. The condensation product may contain chlorine, e.g., connected to one or more P atoms of one or more of the A groups.

The entire description of the process for producing such adducts and the adducts produced thereby as described in the above copending applications is incorporated herein by reference.

While the process of the invention has been described in relation to and is particularly valuable for the isolation and purification of adducts of phosphonitrilic halide, preferably chloride, and polyfunctional material such as hydroquinone, the instant process can be employed to recover any water insoluble reaction product from a crude oil containing such reaction product and water soluble impurities, and which crude oil can be dissolved in a water soluble solvent, and the resulting solution, when introduced into the rapidly moving large volume of drowning medium such as water according to the invention, producing precipitation of the product in the water with simultaneous dissolution of the said impurities in the water.

I have found that the solvent employed for dissolving the oily adduct prior to introduction thereof into the drowning apparatus should have certain properties. First, it must solubilize all of the products of the reaction mixture of phosphonitrilic halide and polyfunctional organic compound, i.e., the oily reaction product, secondly it must be itself water soluble, thirdly it must not react with the adduct, and preferably it should be relatively low boiling so that its last traces which cling to the precipitated solid adduct may be removed quickly at a relatively low drying temperature. Several classes of suitable organic solvents include ketones, such as acetone, methyl ethyl ketone, alcohols, such as methyl, ethyl, isopropyl or butyl, nitriles, such as acetonitrile, acids, such as formic, acetic, propionic, butyric, isobutyric, amides, such as dimethylformamide, diethylacetamide, formamide, and low boiling cyclic ethers, such as tetrahydrofuran. All of these materials have boiling points below about 160° C., and thus are readily removed, in trace amounts, from the precipitated adduct by vacuum drying.

Of the classes of solvents given above it has been found that ketones, aliphatic acids, alcohols and nitriles provide more efficient separations of the adducts of phosphonitrile chlorides with hydroquinone.

If the tertiary amine which was used in the original condensation of phosphonitrile chloride with polyfunctional material such as hydroquinone is water soluble, e.g. pyridine, picolines, etc., in theory the solution of oil and appropriate water-soluble solvent can be drowned, without modification, in the apparatus described above. In practice, however, it has been found that in the case of pyridine and picolines, the adduct obtained upon drowning the oil-solvent solution without modification contains a substantial amount of tertiary amine which has been absorbed by the precipitated solid. This residual tertiary amine is quite difficult to remove from the adduct by normal drying techniques. In addition, it has been demonstrated that the presence of this adsorbed tertiary amine impairs the performance characteristics of the adducts of phosphonitrilic chlorides with hydroquinone, e.g. when employed as coatings or adhesives.

It has been found, however, that when there is added to the oil-solvent solution just prior to drowning, an acid in sufficient amount to convert all of the excess tertiary amine to its corresponding water soluble salt, the adduct is obtained, after drowning, completely free of tertiary amine.

In the event that the tertiary amine used in the original condensation reaction of phosphonitrile chloride and hydroquinone is not itself water soluble, for example tributylamine, it is necessary to convert any excess of such amine in the oil-solvent solution to a water soluble salt so that the amine may be washed from the product by the drowning water. This can be accomplished by the addition of an acid to the oil-solvent solution prior to introduction thereof into the drowning chamber.

Various acids can be used to convert the tertiary amine to the corresponding substituted ammonium salt. For example, aqueous solutions of mineral acids, such as hydrochloric, sulfuric and nitric are suitable. Alternatively, organic acids, such as formic, acetic, propionic, p-toluenesulfonic, etc., can be used. The acid should be added in an amount at least equal to the amount of excess tertiary amine present in the oil, calculated on a molar basis. Since, however, the so formed salt of the tertiary amine is not soluble in some of the solvents described above which are used to dissolve the oily adducts, an amount of water often must be added to the oil-solvent-acid solution to solubilize the salt formed. The amount of water required for this purpose will vary with the amount of excess tertiary amine present in the oil and the acid used, but is usually in the range of about 5 to about 50% by volume of the solvent used.

Under these circumstances I have found that the use of a water soluble acid as the solvent for the oil adduct is preferred, since it obviates the need for adding additional acid to neutralize the excess water insoluble tertiary amine. In this respect acids such as acetic, formic and propionic acids have been found to function well and hence are preferred. However, it has been found that the use of a combination of such an organic acid and a mineral acid of the type noted above, e.g. sulfuric acid, results in conversion of any traces of residual tertiary amine to the corresponding water soluble salt. The amount of mineral acid employed in such combination is preferably such as to provide an excess of mineral acid, e.g. of the order of about 1% of said mineral acid by weight of the solution, following conversion of all of the tertiary amine to the corresponding salt.

I have found that the concentration of oil in the solvent system is of importance in obtaining a flocculent, readily filterable solid adduct upon drowning the oil. Thus when the solvent is 75% by volume acetone-water (75% by volume acetone and 25% by volume water) and the solution contains approximately 12.5% by volume of oil, a flocculent solid product is obtained upon drowning. However, if the concentration of oil in the oil-solvent solution is increased to about 40% by volume, the product which separates upon drowning is usually a viscous oil or gum. This gum can be converted into a solid product, but only after prolonged standing in fresh water from 12 to 48 hours.

There is a variation in the tolerable concentration of oil in different oil solvent systems. Thus, the upper concentration limit of oil in 75% by volume acetone-water is about 25% by volume in order to obtain a flocculent, readily filterable solid product directly upon drowning. However, when the solvent system is 80% by volume acetic acid-water, the concentration of oil can be as high as 70% by volume without the formation of a gummy product upon drowning.

I have also found that the rates of flow of the oil-solvent solution and the moving body of liquid, e.g. water, in the drowning chamber should be controlled in order to avoid formation of a gummy product. For example, when 750 milliliters of a solution of 75% by volume of acetone-water containing approximately 12.5% by volume of oil, plus an amount of concentrated hydrochloric acid necessary to react with the excess tertiary amine, is drowned in 60 seconds into a total of 5 gallons of water, the adduct of phosphonitrilic chloride and hydroquinone is obtained as a flocculent solid which can be isolated readily by filtration. However, when the rate of flow of water is decreased from 5 gallons per minute to 3 gallons per minute, keeping the flow rate of oil solution the same, the adduct is precipitated as a gummy solid.

The same effect is observed when the water flow rate is maintained at 5 gallons per minute and the flow rate of oil is increased to 1,000 milliliters per minute. Under these conditions, a gummy product is obtained rather than a flocculent, readily filterable solid.

With respect to a 75% by volume solution of acetone-water containing approximately 12.5% by volume of oil produced from reaction of phosphonitrilic chloride and hydroquinone, I have found that from about 10 to about 175 milliliters of oil solution per gallon of drowning water may be employed, the optimum ratio being about 150 milliliters of oil solution per gallon of water.

The flow rate of oil-solvent solution and drowning water vary with the solvent system used to dissolve the crude oil. Thus, for an 80% by volume solution of acetic acid-water containing approximately 50% by volume of oil, the flow ratio of such oil solution to drowning water may vary from about 25 to about 600 milliliters, preferably about 300 milliliters, of such solution per gallon of water.

The optimum flow rates of oil-solvent solution and drowning water can be determined readily for the particular solvent system employed.

The above data point out still other advantages of using an acid both to solubilize the crude oil adduct and to react with the excess tertiary amine. Based on optimum flow rates approximately 8 times the volume of oil can be processed according to the invention from 80% acetic acid-water than can be processed from 75% acetone-water in unit time. In addition, the volume of 80% acetic acid-water required to process a given volume of oil is approximately one-seventh the volume of 75% acetone-water solution required to process the same volume of oil.

The solid adducts of phophonitrilic halides and polyfunctional organic compounds isolated according to the herein disclosed procedure further do not undergo decomposition as takes place to some extent when the same adducts are isolated by the procedure of the above copending applications. This is believed to be a result of the greatly decreased time of contact of the adduct with water according to the procedure of this invention. The adducts of phosphonitrilic chloride and hydroquinone isolated by the herein described procedure are generally soluble in ketones, alcohols, esters, amides, acids, and similar types of solvents. This behavior is to be compared with the tendency toward partial ketone insolubility of the adducts after isolation by the procedure of said copending applications, thus requiring an additional purification step.

A further advantage of the herein described procedure of isolation is that the adducts of phosphonitrilic halides and polyfunctional organic compounds are obtained in considerably higher yield than are the same adducts isolated by the procedure of the above copending applications. For example, a condensation reaction of 10 g. of phosphonitrilic chloride with hydroquinone, the product being isolated according to the procedure of said copending applications gave 12.5 g. of solid adduct. This represents a product to starting material (the phosphonitrilic chloride) weight ratio of 1.25 to 1. By the new isolation procedure described in this application, 500 g. of phosphonitrilic chloride and hydroquinone gave 865 g. of solid adduct. This represents a product to starting material weight ratio of 1.73 to 1, or an increase in yield of approximately 38%.

The following examples illustrate practice of the invention.

Example 1

A reaction flask was charged with 500 g. of a mixture of trimeric and tetrameric phosphonitrilic chlorides (75% trimer and 25% tetramer), 1188 g. of hydroquinone, and 7.5 liters of carbon tetrachloride. This mixture was stirred and heated to reflux, then 854 g. of anhydrous pyridine (a 21% by weight excess) was added, then refluxing and stirring were continued for a period of from 6 to 18 hours. When cool, the carbon tetrachloride was removed by decantation, leaving approximately 2200 milliliters of a thick, greenish-yellow oil, which was a mixture of the adduct of the phosphonitrilic chloride and hydroquinone, excess hydroquinone, pyridinium hydrochloride, excess pyridine, and some carbon tetrachloride. The oil obtained in this manner was used to obtain the data in this and Examples 2 to 5.

The residual oil was dissolved in 17 liters of a solution containing 75% by volume of acetone-water. To this was added 400 milliliters of concentrated hydrochloric acid and the solution shaken well; the solution contained approximately 12.5% by volume of oil.

The reservoir tank containing the above solution was connected to two of the adjacent oil inlet tubes, $B_1$ and $B_2$, of the apparatus described in the drawing; the remaining adjacent inlet tubes $B_3$ and $B_4$ were connected to a source of nitrogen.

Water was passed through inlet tube A at the rate of 5 gallons per minute. Simultaneously, nitrogen was passed through tubes $B_3$ and $B_4$ at between 3 and 20 pounds per square inch. The oil-solvent solution then was pumped into the drowning chamber through tubes $B_1$ and $B_2$ at a rate of 725 to 775 milliliters per minute, and the mixture of water solution of impurities and precipitated adduct was collected in a large tank (not shown) placed beneath outlet E of the apparatus in a drying oven, the entire isolation procedure from the point of decantation of the carbon tetrachloride from the cooled reaction mixture to drying of the product being accomplished in about 30 minutes. The dried adduct weighed 751 g. and was completely soluble in acetone.

Example 2

When the solution of oil in 75% by volume of acetone-water, described in Example 1, was drowned at an oil solution flow rate of 725 to 775 milliliters per minute with a water flow rate of 3 gallons per minute, the adduct of phosphonitrilic chloride and hydroquinone was obtained as a gummy solid which was not readily filtrable.

A gummy product also was obtained when the water flow rate was maintained at 5 gallons per minute and the flow rate of oil solution was increased to 1000 milliliters per minute.

The gummy adducts were allowed to stand in fresh water for 48 hours, during which time the gum solidified.

Example 3

A solution of oil of Example 1, 12.5% by volume, in 75% by volume acetone-water was prepared without the addition of hydrochloric acid. When this solution was processed according to the procedure of Example 1 there was obtained a flocculent, readily filtrable solid adduct which was completely soluble in acetone, but which had an odor of pyridine, even after repeated washing with water, and drying.

Example 4

The oily reaction product of Example 1 was dissolved in 3.0 liters of a solution of 80% by volume acetic acid-water. This solution was processed according to the procedure of Example 1. The adduct was precipitated as a flocculent solid which when filtered, washed in the water and dried weighted 865 g. and was completely soluble in acetone. The time required for the isolation of the product was less than 30 minutes.

Example 5

The oily reaction product of Example 1 was dissolved in 3.0 liters of a solution of 80% by volume acetic acid-water. This oil solution was pumped through all four inlet tubes, $B_1$, $B_2$, $B_3$ and $B_4$, at the rate of 1.5 liters per minute and at a water flow rate of 5 gallons per minute. The adduct of the phosphonitrilic chlorides and hydroquinone was precipitated in the form of a flocculent solid which, when filtered, washed in the water and dried, weighed 865 g. and was completely soluble in acetone.

Example 6

A condensation reaction of 500 g. of the mixture of trimeric and tetrameric phosphonitrilic chloride and hydroquinone was carried out as described in Example 1 except that α-picoline was used as the tertiary amine in place of the pyridine. The oily product obtained was dissolved in 3.0 liters of a solution of 80% by volume of acetic acid-water. This oil solution was drowned by the procedure of Example 5, giving a flocculent, readily filterable solid adduct, which weighed 832 g. and was completely soluble in acetone.

Example 7

A condensation reaction of 500 g. of trimeric phosphonitrilic chloride and hydroquinone was carried out as described in Example 1. The oily product obtained was dissolved in 3.0 liters of a solution of 80% by volume acetic acid-water, and the solution processed by the procedure of Example 5. A flocculent, easily filtered solid adduct of trimeric phosphonitrilic chloride and hydroquinone was obtained which weighed 860 g. and was completely soluble in acetone.

Example 8

A condensation reaction of 500 g. of tetrameric phosphonitrilic chloride and hydroquinone was carried out as described in Example 1. The oily product obtained was dissolved in 3.0 liters of a solution of 80% by volume acetic acid-water, and the solution processed by the procedure of Example 5. A flocculent, easily filtered, solid adduct of tetrameric phosphonitrilic chloride and hydroquinone was obtained which weighed 870 g. and was completely soluble in acetone.

Example 9

A condensation reaction of 500 g. of the mixture of trimeric and tetrameric phosphonitrilic chloride noted in Example 1, and 1188 g. of catechol was carried out as described in Example 1. The oily product obtained was dissolved in 3.0 liters of a solution of 80% by volume acetic acid-water. This oil solution was processed by the procedure of Example 5, giving a flocculent, readily filterable solid adduct, which weighed 825 g. and was completely soluble in acetone.

Example 10

A condensation reaction of 500 g. of the mixture of trimeric and tetrameric phosphonitrilic chloride noted in Example 1, and 1188 g. of resorcinol was carried out as described in Example 1, except using a reflux time of about one hour. The oily product obtained was dissolved in 3.0 liters of a solution of 80% by volume acetic acid-water. This oil solution was processed by the procedure of Example 5, giving a flocculent, readily filterable solid adduct, which weighed 430 g. and was completely soluble in acetone.

Example 11

A condensation reaction of 500 g. of the mixture of trimeric and tetrameric phosphonitrilic chloride and 1188 g. of hydroquinone was carried out as described in Example 1. The oily product obtained was dissolved in 3.0 liters of a solution of 80% by volume formic acid-water. This oil solution was processed by the procedure of Example 5, giving a flocculent, readily filterable solid adduct, which weighed 840 g. and was completely soluble in acetone.

Example 12

The oily reaction product of Example 1 was dissolved in 3.25 liters of a solution of 80% by volume of acetic acid in water, and 250 cc. concentrated (33%) hydrochloric acid was added to such solution. This solution was processed according to the procedure of Example 1. The adduct was precipitated as a flocculent solid which when filtered, washed in the water and dried weighed 865 g. and was completely soluble in acetone. The time required for the isolation of the product was less than 30 minutes.

From the foregoing, it is seen that I have provided a novel procedure, particularly designed for purification and isolation of the condensation product or adduct of phosphonitrilic chlorides with polyfunctional compounds, especially polyhydroxy aromatic compounds such as hydroquinone, which procedure has several important advantages over the procedure described in the above copending applications for this purpose, namely (1) the isolation procedure of this invention is carried out in a much shorter period of time, (2) such procedure is carried out in a simple manner with a minimum number of manipulative steps employing a novel simple apparatus, (3) such procedure employs a minimum of washing liquid, e.g. water, (4) the procedure of the invention results in substantially no decomposition of the adduct with consequent higher yield obtained as compared to the procedure of the above copending applications.

While I have described particular embodiments of my invention for the purpose of illustration, it should be understood that various modifications and adaptations thereof may be made within the spirit of the invention as set forth in the appended claims.

I claim:

1. The process for the isolation and purification of the adduct of cyclic phosphonitrilic chloride and a polyhydroxy aromatic compound, formed in the presence of a tertiary amine, the PN rings of said phosphonitrilic chloride being present in said adduct, which comprises introducing a water soluble solvent solution of the crude oil containing said adduct and impurities of the condensation reaction for producing said adduct, including tertiary amine hydrochloride, in the form of a stream into a body of flowing water, said adduct being insoluble in water and said impurities being soluble in said body of water, precipitating said adduct in said water and dissolving therein said impurities and solvent, the rate of introduction of said solution into said water being controlled to produce a light flocculent solid precipitate removing a mixture containing said water, solvent and precipitate, and recovering said solid from the resulting mixture.

2. The process for the isolation and purification of the adduct of a cyclic phosphonitrilic chloride and hydroquinone formed in the presence of tertiary amine, the PN rings of said phosphonitrilic chloride being present in said adduct, which comprises introducing a water soluble solvent solution of the crude oil containing said adduct and impurities of the condensation reaction for producing said adduct, including excess tertiary amine hydrochloride, in a plurality of streams into a chamber and into a relatively large volume of water flowing through said chamber, said adduct being insoluble in water and said impurities being water soluble, said streams being directed to impinge at a common localized section of said chamber in said body of water, to thereby cause rapid dispersion of said streams of solution in said body of water, precipitating said adduct in said water and dissolving therein said impurities and solvent, the rate of introduction of said solution into said water being controlled to produce a light flocculent solid precipitate removing a mixture containing said water, solvent and precipitate, and recovering said solid from the resulting mixture.

3. The process for the isolation and purification of the adduct of cyclic phosphonitrilic chlorides of the group consisting of trimeric and tetrameric phosphonitrilic chlorides and mixtures thereof, and a polyhydroxy aromatic compound, formed in the presence of a tertiary amine as HCl acceptor, the PN rings of said phosphonitrilic chloride being present in said adduct, which comprises separating said adduct from the reaction mixture in the form of an oil containing in addition to said adduct impurities including the hydrochloride of said tertiary amine, excess tertiary amine and excess polyhydroxy aromatic compound, dissolving said oil in a water soluble solvent of the group consisting of ketones, aliphatic acids, alcohols and nitriles, introducing said solution in a plurality of streams into a confined zone and into contact with a relatively large volume of water flowing continuously through said zone, said streams being directed to impinge at a common localized section of said zone within said volume of water, to thereby cause rapid dispersion of said streams of solution in said water, precipitating said adduct in said volume of water and dissolving therein said impurities and solvent, the rate of introduction of said solution into said water being controlled to produce a light flocculent solid precipitate of said adduct, flowing the resulting mixture containing said water, solvent, impurities and precipitate out of said zone, and separating the precipitated adduct from said mixture.

4. The process for the isolation and purification of the adduct of cyclic phosphonitrilic chlorides of the group consisting of trimeric and tetrameric phosphonitrilic chlorides and mixtures thereof, and a polyhydroxy aromatic compound, formed in the presence of pyridine, the PN rings of said phosphonitrilic chloride being present in said adduct, which comprises separating said adduct from the reaction mixture in the form of an oil containing in addition to said adduct, impurities including pyridine hydrochloride, excess pyridine and excess hydroquinone, dissolving said oil in a water soluble ketone solvent, adding an acid to said oil-solvent solution in amount sufficient to convert said excess pyridine to the pyridine salt of said acid, said solution containing an amount of water sufficient to solubilize said pyridine salt, introducing said solution in a plurality of streams into a confined zone and into contact with a relatively large volume of water flowing continuously through said zone, said streams being directed to impinge at a common localized section of said zone within said volume of water, to thereby cause rapid dispersion of said streams of solution in said water, precipitating said adduct in said volume of water and dissolving therein said impurities and solvent, the rate of the introduction of said solution into said water being controlled to produce a light flocculent solid precipitate of said adduct, flowing the resulting mixture containing said water, solvent, impurities and precipitate out of said zone, and separating the solid adduct from said mixture.

5. The process for the isolation and purification of the adduct of cyclic phosphonitrilic chlorides of the group consisting of trimeric and tetrameric phosphonitrilic chlorides and mixtures thereof, and hydroquinone, in the presence of pyridine, the PN rings of said phosphonitrilic chlorides being present in said adduct, which comprises separating said adduct from the reaction mixture in the form of an oil containing in addition to said adduct, impurities including pyridine hydrochloride, excess pyridine and excess hydroquinone, dissolving said oil in acetone as solvent, adding an acid to said oil-solvent solution in amount sufficient to convert said excess pyridine to the pyridine salt of said acid, said solution containing an amount of water sufficient to solubilize said pyridine salt, introducing said solution in a plurality of streams into a confined zone and into contact with a relatively large volume of water flowing continuously through said zone, said streams being directed to impinge at a common localized section of said zone within said volume of water, to thereby cause rapid dispersion of said streams of solution in said water, precipitating said adduct in said volume of water and dissolving therein said impurities and solvent, the rate of the introduction of said solution into said water being controlled to produce a light flocculent solid precipitate of said adduct, flowing the resulting mixture containing said water, solvent, impurities and precipitate out of said zone, and separating the solid adduct from said mixture.

6. The process for the isolation and purification of the adduct of cyclic phosphonitrilic chlorides of the group consisting of trimeric and tetrameric phosphonitrilic chlorides and mixtures thereof, and hydroquinone, in the presence of pyridine, the PN rings of said phosphonitrilic chloride being present in said adduct, which comprises separating said adduct from the reaction mixture in the form of an oil containing in addition to said adduct, impurities including pyridine hydrochloride, excess pyridine and excess hydroquinone, dissolving said oil in a water-soluble aliphatic acid solvent of the group consisting of formic, acetic and propionic acids, said acid converting said excess pyridine to the corresponding salt, said solvent containing water in amount sufficient to solubilize said pyridine salt, introducing said solution in a plurality of streams into a confined zone and into contact with a relatively large volume of water flowing continuously through said zone, said streams being directed to impinge at a common localized section of said zone within said volume of water, to thereby cause rapid dispersion of said streams of solution in said water, precipitating said adduct in said volume of water and dissolving therein said impurities and solvent, the rate of introduction of said solution into said water being controlled to produce a light flocculent solid precipitate of said adduct, flowing the resulting mixture containing said water, solvent, impurities and precipitate out of said zone, and separating the precipitated adduct from said mixture.

7. The process of claim 5, wherein said acetone solvent consists essentially of about 75% by volume of acetone and about 25% by volume of water, said oil-solvent solution containing an amount of said oil not substantially in excess of about 25% by volume.

8. The process of claim 7, wherein said oil-solvent solution contains about 12.5% by volume of said oil, said streams of oil-solvent solution being introduced into said relatively large volume of water in said confined zone, at a rate of about 150 milliliters of oil-solvent solution per gallon of water.

9. The process of claim 6, wherein said solvent comprises acetic acid, there being about 80% by volume of acetic acid and about 20% by volume of water in said solvent.

10. The process of claim 9, wherein said oil-solvent solution contains about 50% by volume of said oil, said streams of oil-solvent solution being introduced into said relatively large volume of water in said confined zone, at a rate of about 300 milliliters of oil-solvent solution per gallon of water.

11. The process for the isolation and purification of the adduct of cyclic phosphonitrilic chlorides of the group consisting of trimeric and tetrameric phosphonitrilic chlorides and mixtures thereof, and hydroquinone, in the presence of pyridine, the PN rings of said phosphonitrilic chloride being present in said adduct, which comprises separating said adduct from the reaction mixture in the form of an oil containing in addition to said adduct, impurities including pyridine hydrochloride, excess pyridine and excess hydroquinone, dissolving said oil in a water-soluble aliphatic acid solvent of the group consisting of formic, acetic and propionic acids, adding a mineral acid of the group consisting of hydrochloric, sulfuric and nitric acids, said acids converting said excess pyridine to the corresponding salt, the resulting solution containing water in amount sufficient to solubilize said pyridine salt, introducing said solution in a plurality of streams into a confined zone and into contact with a relatively large volume of water flowing continuously through said zone, said streams being directed to impinge at a common localized section of said zone within said volume of water, to thereby cause rapid dispersion of said streams of solution in said water, precipitating said adduct in said volume of water and dissolving therein said impurities and solvent, the rate of introduction of said solution into said water being controlled to produce a light flocculent solid precipitate of said adduct, flowing the resulting mixture containing said water, solvent, impurities and precipitate out of said zone, and separating the precipitated adduct from said mixture.

12. The process for the isolation and purification of the adduct of cyclic phosphonitrilic chlorides of the group consisting of trimeric and tetrameric phosphonitrilic chlorides and mixtures thereof, and a polyhydroxy aromatic compound, formed in the presence of a tertiary amine as HCl acceptor, the PN rings of said phosphonitrilic chloride being present in said adduct, which comprises separating said adduct from the reaction mixture in the form of an oil containing in addition to said adduct impurities including the hydrochloride of said tertiary amine, excess tertiary amine and excess polyhydroxy aromatic compound, dissolving said oil in a water-soluble solvent of the group consisting of ketones, aliphatic acids, alcohols and nitriles, introducing said solution in a plurality of streams into a confined zone and into contact with a relatively large volume of water flowing continuously through said zone, precipitating said adduct in said volume of water, and dissolving therein said impurities and solvent, the rate of introduction of said solution into said water being controlled to produce a light flocculent solid precipitate of said adduct, flowing the resulting mixture containing said water, solvent, impurities and precipitate out of said zone, and separating the precipitated adduct from said mixture.

References Cited by the Examiner
UNITED STATES PATENTS

| | | | |
|---|---|---|---|
| 2,709,641 | 5/1955 | Gerhold | 23—270.5 |
| 2,866,773 | 12/1958 | Redfern | 260—47 |
| 2,900,238 | 8/1959 | Jones | 23—270.5 |
| 2,900,365 | 8/1959 | Haven | 260—47 |

SAMUEL H. BLECH, *Primary Examiner.*

WILLIAM H. SHORT, *Examiner.*

J. C. MARTIN, *Assistant Examiner.*